(12) United States Patent
Yu

(10) Patent No.: US 6,669,283 B2
(45) Date of Patent: Dec. 30, 2003

(54) FRAME OF BICYCLE SADDLE

(76) Inventor: Tsai-Yun Yu, No. 1-2, Lane 1147, Sec. 1, Chung San Road, Ta Chia Chen, Taichung Hsien (TW)

(*) Notice: Subject to any disclaimer, the term of this patent is extended or adjusted under 35 U.S.C. 154(b) by 101 days.

(21) Appl. No.: 09/973,917

(22) Filed: Oct. 11, 2001

(65) Prior Publication Data

US 2003/0071498 A1 Apr. 17, 2003

(51) Int. Cl.$^7$ .................................................. B62J 1/18
(52) U.S. Cl. .................. 297/215.16; 297/201; 297/202; 297/214
(58) Field of Search ............................ 297/215.16, 201, 297/202, 214

(56) References Cited

U.S. PATENT DOCUMENTS

| | | | | |
|---|---|---|---|---|
| 556,250 A | * | 3/1896 | Brown ........................ 297/202 |
| 1,538,542 A | * | 5/1925 | Blake ......................... 297/202 |
| 1,858,477 A | * | 5/1932 | Blake ......................... 297/202 |
| 5,165,752 A | * | 11/1992 | Terry ...................... 297/202 X |
| 5,352,016 A | * | 10/1994 | Hobson ...................... 297/201 |
| 5,356,198 A | * | 10/1994 | Hughes ............. 297/215.16 X |
| 5,387,024 A | * | 2/1995 | Bignolin ............ 297/215.16 X |
| 5,397,162 A | * | 3/1995 | Huang ................ 297/215.16 X |
| 5,765,912 A | * | 6/1998 | Bontrager ............... 297/202 X |
| 5,904,396 A | * | 5/1999 | Yates .......................... 297/214 |
| 6,030,035 A | * | 2/2000 | Yates .......................... 297/214 |
| 6,095,601 A | * | 8/2000 | Yu ......................... 297/215.16 |
| 6,149,230 A | * | 11/2000 | Bontrager ................... 297/202 |
| 6,193,309 B1 | * | 2/2001 | Gootter et al. .............. 297/202 |
| 6,224,151 B1 | * | 5/2001 | Mcmullen, Jr. ............. 297/202 |
| 6,244,655 B1 | * | 6/2001 | Minkow et al. .... 297/215.16 X |
| 6,254,180 B1 | * | 7/2001 | Nelson ........................ 297/201 |
| 6,322,139 B1 | * | 11/2001 | Chuang ................ 297/202 X |
| 6,450,572 B1 | * | 9/2002 | Kuipers .................. 297/202 X |
| 2003/0042770 A1 | * | 3/2003 | Yu .......................... 297/215.16 |

* cited by examiner

Primary Examiner—Rodney B. White
(74) Attorney, Agent, or Firm—Browdy and Neimark, P.L.L.C.

(57) ABSTRACT

A frame of a bicycle saddle includes a rigid main body molded from rigid plastics and an elastic member molded on the main body from elastic material of hardness lower than the rigid plastics of the main body. The main body has a narrow front portion and a wide rear portion. The elastic member is bounded to a front end of the front portion of the main body and has a smoothly arched front side edge, which provides a cushion in the front end of the saddle to decrease the uncomfortable feeling of the bicyclist when the bicyclist is in contact with the front end of the saddle.

5 Claims, 4 Drawing Sheets

FRAME OF BICYCLE SADDLE

FIELD OF THE INVENTION

The present invention relates generally to a bicycle saddle, and more particularly to a frame of the bicycle saddle, which provides comfortable feeling to the bicyclist when the bicyclist is in contact with the front end of the saddle.

BACKGROUND OF THE INVENTION

The conventional bicycle saddle has a relatively narrower front end and a relatively wider rear end. The conventional bicycle saddle is generally comprised of a plastic frame, a middle layer formed of foamed material and bonded to the top side of the plastic frame, and a soft covering layer covered on the middle layer. Since the middle layer is formed of foamed material, it provides a cushion to buffer the pressure from the bicyclist. Because the plastic frame is adapted to support the whole structure of the saddle on the seat post, it must have certain hardness. Since the plastic frame is rigid, the bicyclist feels uncomfortable when hitting the front end of the saddle with the thighs or the hips accidentally.

SUMMARY OF THE INVENTION

It is the primary objective of the present invention to provide a frame of a bicycle saddle, which could decrease the uncomfortable feeling of the bicyclist when the bicyclist is in contact with the front end of the saddle with a part of the body.

The foregoing objective of the present invention is attained by a frame of a bicycle saddle comprising a main body made of rigid plastics which has a narrow front portion and a wide rear portion. The frame further comprises an elastic member bonded to a front end of the front portion of the main body. The elastic member is flexible and has a hardness lower than the hardness of the main body so as to provide a suitable cushion to decrease the uncomfortable feeling of the bicyclist when the bicyclist is in contact with the front end of the saddle.

DETAILED DESCRIPTION OF THE INVENTION

Figure 1:
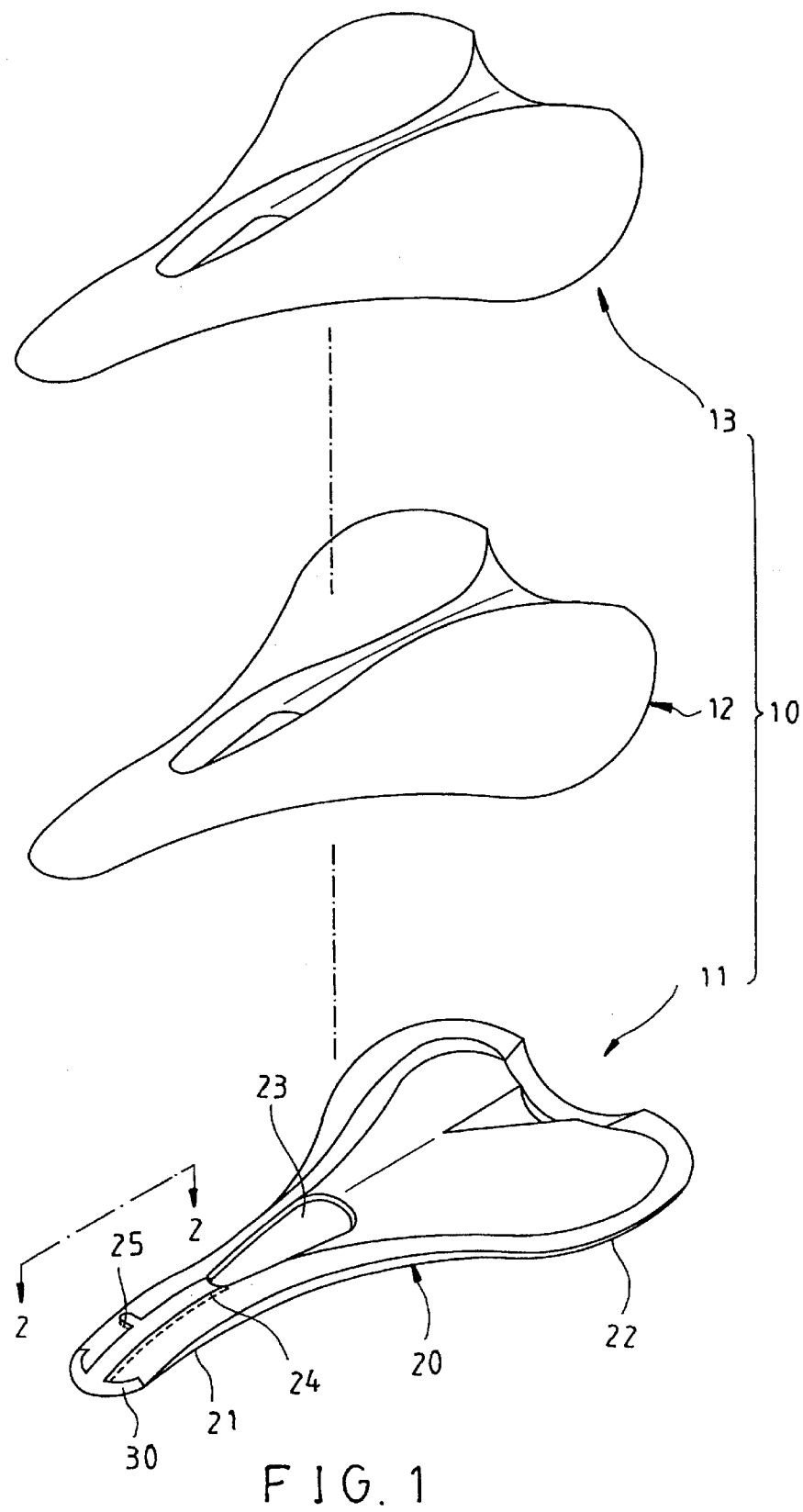
FIG. 1 shows an exploded view of a bicycle saddle according to a first preferred embodiment of the present invention.
Figure 2:
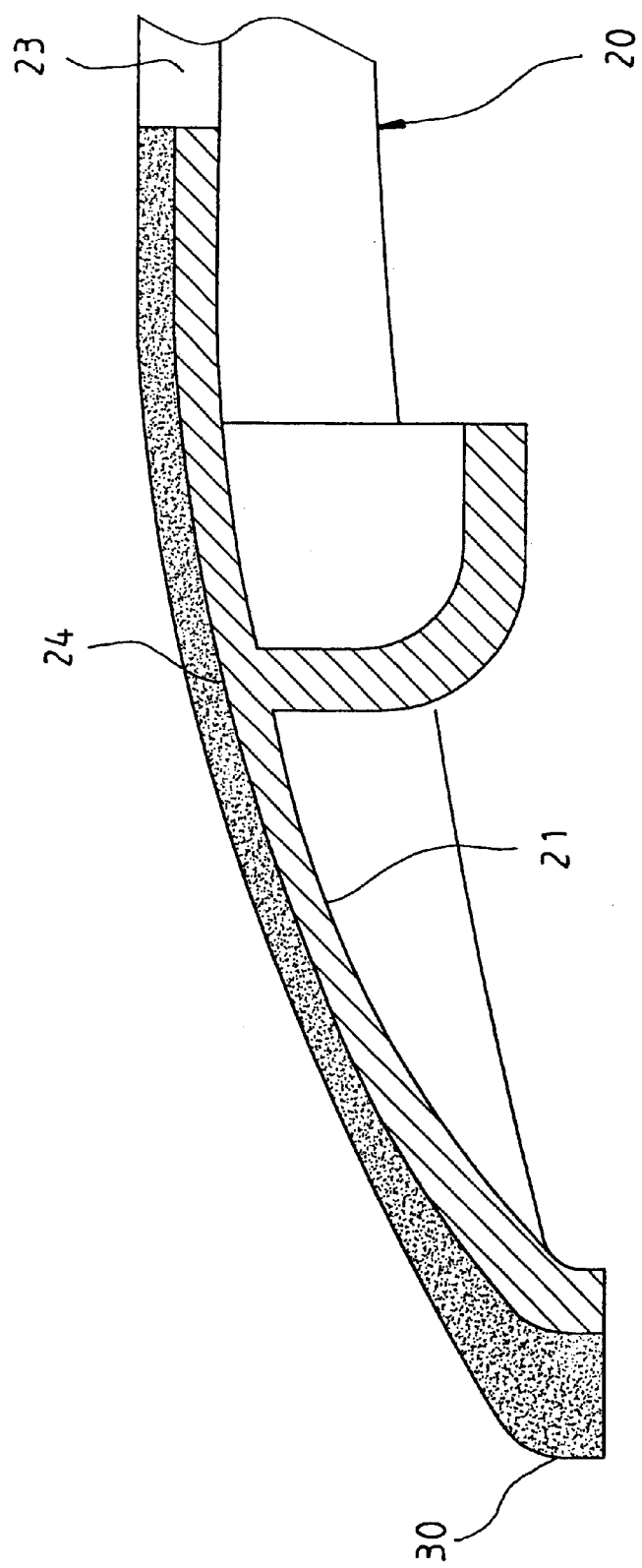
FIG. 2 shows a sectional view taken along a line 2—2 as shown in FIG. 1.

As shown in FIGS. 1–2, a bicycle saddle 10 is formed of a frame 11, an intermediate layer 12 of foamed material bonded to the top side of the frame 11, and an outer covering layer 13 of soft material covered on the intermediate layer 12.

According to a first preferred embodiment of the present invention, the frame 11 comprises a main body 20 and an elastic member 30. The main body 20 is molded from rigid plastic. The main body 20 has a relatively narrower front portion 21, a relatively wider rear portion 22, and a hollow 23 adjacent to the front portion 21. Further, the main body 20 has a longitudinal groove 24 longitudinally extended from a front end of the front portion 21 to the hollow 23, and a transverse groove 25 perpendicularly extended from a middle part of the longitudinal groove 24 toward one lateral side. The elastic member 30 is bonded to the front end of the front portion 21 and fills up the longitudinal groove 24 and the transverse groove 25 so as to ensure a firm connection between the elastic member 30 and the main body 20. The hardness of the material for the elastic member 30 is lower than that for the main body 20. According to the present preferred embodiment, the elastic member 30 is directly molded on the front end and the grooves 24, 25 of the front portion 21 of the main body 20 from rubber, and the front side edge of the elastic member 30 is smoothly arched.

Because the elastic member 30 connects the front end of the front portion 21 of the main body 20 to form the front end of the frame 11 and has a smoothly arched periphery, the saddle 10 provides a suitable cushion in the front end thereof so as to decrease the uncomfortable feeling of the bicyclist when the bicyclist is in contact with the front end of the saddle.

Figure 3:
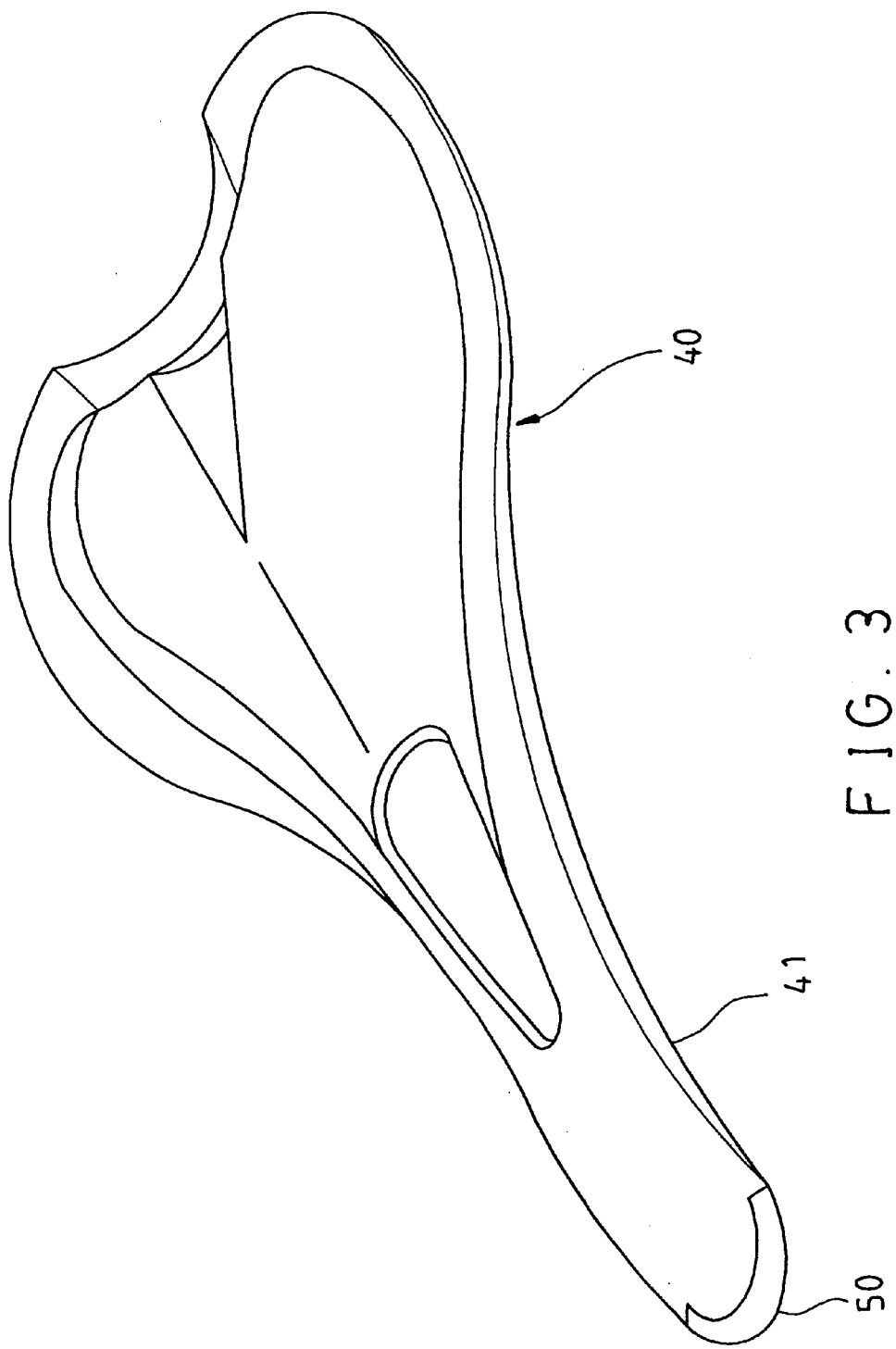
FIG. 3 shows a perspective view of a frame of a bicycle saddle according to a second preferred embodiment of the present invention.
Figure 4:
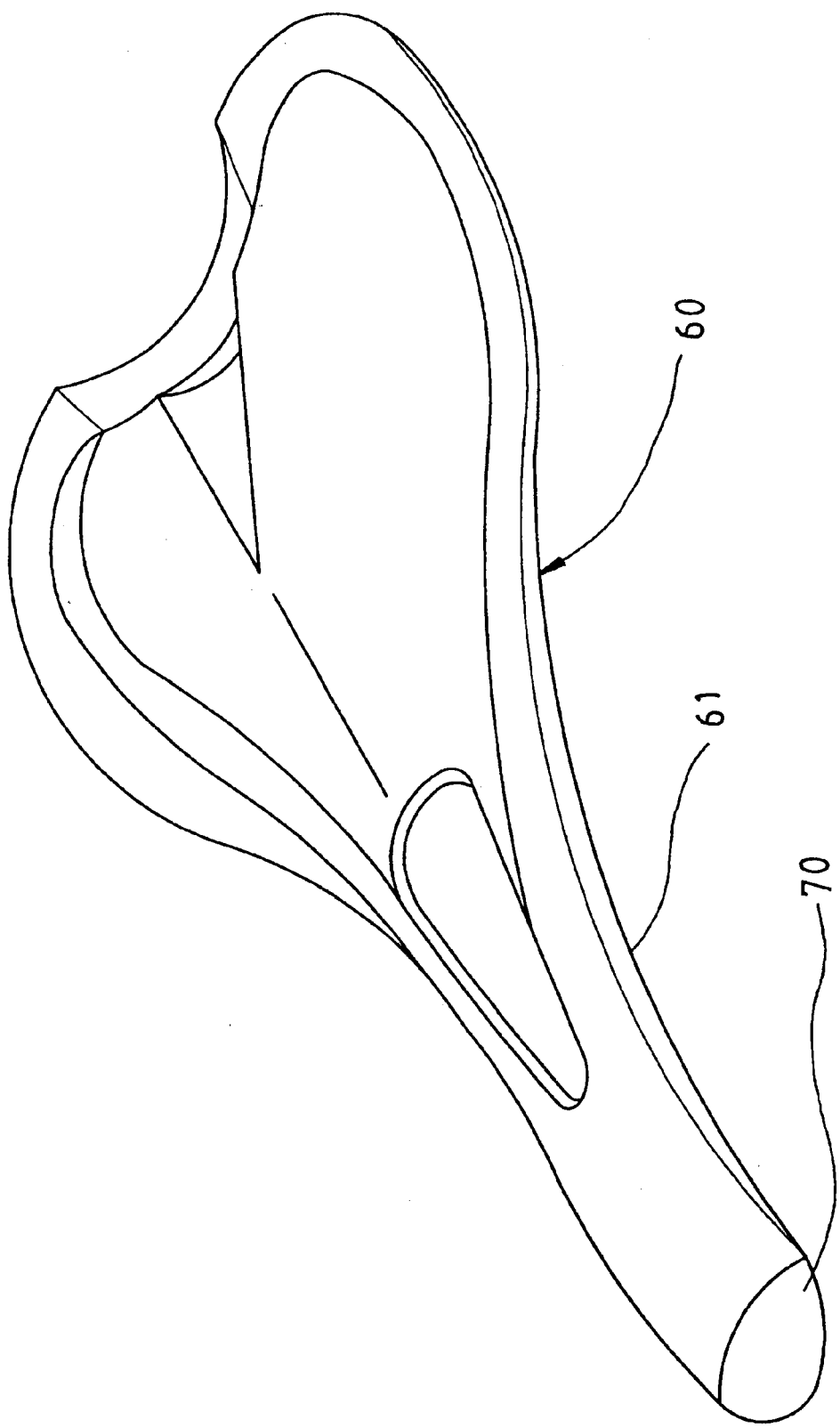
FIG. 4 shows a perspective view of a frame of a bicycle saddle according to a third preferred embodiment of the present invention.

The present invention may be variously embodied. FIGS. 3 and 4 show two different alternate forms of the present invention. According to the second preferred embodiment shown in FIG. 3, the elastic member 50 is shaped like an arc and bounded to the front end of the narrower front portion 41 of the main body 40 of the frame. According to the third preferred embodiment shown in FIG. 4, the elastic member 70 is shaped like a semispherical shell and bounded to the front end of the narrower front portion 61 of the main body 60 of the frame.

What is claimed is:

1. A frame of a bicycle saddle, said frame comprising:

a main body made of rigid plastics, said main body having a narrow front portion and a wide rear portion;

an elastic member molded on said main body from elastic material of hardness lower than the rigid plastics of said main body and fixed only at an outer front end of the front portion of said main body so as to freely extend out from the outer front end, said elastic member having a smoothly arched outer front side edge; and rear edges that are flush with edges of the outer front end of the front portion of the main body.

2. The frame as defined in claim 1, wherein said main body is provided with a longitudinal groove extended from the front end of the front portion toward the rear portion, and said elastic member fills up said longitudinal groove.

3. The frame as defined in claim 2, wherein said main body is further provided with a transverse groove perpendicularly extended from a middle part of said longitudinal groove toward a lateral side of the front portion, and said elastic member fills up said transverse groove.

4. The frame as defined in claim 1, wherein said elastic member is shaped as an arc and fixed only to the outer front end of said narrow front portion of said main body.

5. The frame as defined in claim 1, wherein said elastic member is shaped as a semispherical shell and fixed only to the outer front end of said narrow front portion of said main body.

* * * * *